United States Patent [19]
Franke et al.

[11] Patent Number: 6,103,151
[45] Date of Patent: Aug. 15, 2000

[54] EXTRUSION DIE FOR BIODEGRADABLE MATERIAL WITH FLOW CONTROL DEVICE

[75] Inventors: Hans G. Franke, Incline Village, Nev.; Donald R. Bittner, Irving, Tex.

[73] Assignee: Standard Starch, LLC, Tampa, Fla.

[21] Appl. No.: 09/035,560

[22] Filed: Mar. 5, 1998

[51] Int. Cl.[7] .............................. B29C 47/20; B29C 47/92
[52] U.S. Cl. .................. 264/40.7; 264/209.2; 264/209.8; 264/210.2; 425/145; 425/380; 425/382.4; 425/466; 425/467
[58] Field of Search .............................. 264/40.7, 209.2, 264/209.8, 210.2; 425/145, 380, 382.4, 466, 467

[56] References Cited

U.S. PATENT DOCUMENTS

| | | |
|---|---|---|
| 3,137,592 | 6/1964 | Protzman et al. . |
| 3,769,397 | 10/1973 | Cook et al. .......................... 264/209.2 |
| 4,108,590 | 8/1978 | Kontz ...................................... 425/466 |
| 4,125,495 | 11/1978 | Griffin . |
| 4,133,784 | 1/1979 | Otey et al. . |
| 4,337,181 | 6/1982 | Otey et al. . |
| 4,432,718 | 2/1984 | Wurzer ................................... 425/466 |
| 4,454,268 | 6/1984 | Otey et al. . |
| 4,673,438 | 6/1987 | Wittwer et al. . |
| 5,087,650 | 2/1992 | Willett . |
| 5,095,054 | 3/1992 | Lay et al. . |
| 5,186,990 | 2/1993 | Starcevich . |
| 5,208,267 | 5/1993 | Neumann et al. . |
| 5,252,271 | 10/1993 | Jeffs . |
| 5,258,430 | 11/1993 | Bastioli et al. . |
| 5,292,782 | 3/1994 | Bastioli et al. . |

(List continued on next page.)

FOREIGN PATENT DOCUMENTS

| | | |
|---|---|---|
| 788896 | 7/1968 | Canada . |
| 183 153 | 6/1986 | European Pat. Off. . |
| 712 883 A1 | 5/1996 | European Pat. Off. . |
| 1542310 | 10/1968 | France . |
| 659706 | 4/1938 | Germany . |
| 1479351 | 4/1969 | Germany . |
| 297 07 060 U1 | 4/1997 | Germany . |
| 270677 | 7/1964 | Netherlands . |
| 420593 | 3/1967 | Switzerland . |
| 1183027 | 3/1970 | United Kingdom . |
| WO 90/15706 | 12/1990 | WIPO . |

OTHER PUBLICATIONS

International Search Report No. PCT/US90/03394, dated Nov. 2, 1990.

EPO Standard Search Report No. RS 100726, dated May 13, 1998.

EPO Standard Search Report No. RS 100729 DE, dated May 19, 1998.

*Primary Examiner*—Leo B. Tentoni
*Attorney, Agent, or Firm*—R. William Beard, Jr.; Frohwitter

[57] ABSTRACT

An extrusion die for extruding biodegradable material into a flexible, pliable and non-brittle structure, the extrusion die including: a cylindrical mandrel; a cylindrical outer ring positioned concentrically around the mandrel; an annular extrusion orifice between the mandrel and the outer ring; and a flow control device which controls flow of biodegradable material through the extrusion die, wherein the flow control device comprises a mechanism which translates the outer ring to adjust the width of the annular extrusion orifice, and wherein the flow control device further includes a flow control channel upstream of the extrusion orifice which throttles flow of the biodegradable material through the die. A process for extruding biodegradable material into a flexible, pliable and non-brittle structure, the process including: pressurizing biodegradable material in an extruder; cooking biodegradable material in the extruder; charging an extrusion die with biodegradable material from the extruder; controlling the flow rate of biodegradable material through the extrusion die, wherein the controlling includes adjusting a width of an extrusion orifice, and wherein the controlling comprises throttling the biodegradable material upstream of the extrusion orifice through a flow control channel.

19 Claims, 8 Drawing Sheets

U.S. PATENT DOCUMENTS

| | | |
|---|---|---|
| 5,314,754 | 5/1994 | Knight . |
| 5,322,866 | 6/1994 | Mayer et al. . |
| 5,362,778 | 11/1994 | Famili et al. . |
| 5,384,170 | 1/1995 | Bastioli et al. . |
| 5,397,834 | 3/1995 | Jane et al. . |
| 5,409,973 | 4/1995 | Bastioli et al. . |
| 5,427,614 | 6/1995 | Wittwer et al. . |
| 5,512,090 | 4/1996 | Franke et al. . |
| 5,660,900 | 8/1997 | Andersen et al. . |
| 5,766,529 | 6/1998 | Franke et al. . |

EXTRUSION DIE FOR BIODEGRADABLE MATERIAL WITH FLOW CONTROL DEVICE

BACKGROUND OF THE INVENTION

This invention relates generally to the formation of objects from biodegradable materials, and, in particular, to an extrusion die for extruding biodegradable material.

Biodegradable materials are presently in high demand for applications in packaging materials. Commonly used polystyrene ("Styrofoam" (Trademark)), polypropylene, polyethylene, and other non-biodegradable plastic-containing packaging materials are considered detrimental to the environment and may present health hazards. The use of such non-biodegradable materials will decrease as government restrictions discourage their use in packaging applications. Biodegradable materials that are flexible, pliable and non-brittle are needed in a variety of packaging applications, particularly for the manufacture of shaped biodegradable containers for food packaging. For such applications, the biodegradable material must have mechanical properties that allow it to be formed into and hold the desired container shape, and be resistant to collapsing, tearing or breaking.

Starch is an abundant, inexpensive biodegradable polymer. A variety of biodegradable based materials have been proposed for use in packaging applications. Conventional extrusion of these materials produces expanded products that are brittle, sensitive to water and unsuitable for preparation of packaging materials. Attempts to prepare biodegradable products with flexibility, pliability or resiliency and other mechanical properties acceptable for various biodegradable packaging applications have generally focused on chemical or physio-chemical modification of starch, the use of expensive high amylose starch or mixing starch with synthetic polymers to achieve the desired properties while retaining a degree of biodegradability. A number of references relate to extrusion and to injection molding of starch-containing compositions.

U.S. Pat. No. 5,397,834 provides biodegradable, thermoplastic compositions made of the reaction product of a starch aldehyde with protein. According to the disclosure, the resulting products formed with the compositions possess a smooth, shiny texture, and a high level of tensile strength, elongation, and water resistance compared to articles made from native starch and protein. Suitable starches which may be modified and used according to the invention include those derived, for example, from corn including maize, waxy maize and high amylose corn; wheat including hard wheat, soft wheat and durum wheat; rice including waxy rice; and potato, rye, oat, barley, sorghum, millet, triticale, amaranth, and the like. The starch may be a normal starch (about 20–30 wt-% amylose), a waxy starch (about 0–8 wt-% amylose), or a high-amylose starch (greater than about 50 wt% amylose).

U.S. Pat. Nos. 4,133,784, 4,337,181, 4,454,268, 5,322, 866, 5,362,778, and 5,384,170 relate to starch-based films that are made by extrusion of destructurized or gelatinized starch combined with synthetic polymeric materials. U.S. Pat. No. 5,322,866 specifically concerns a method of manufacture of biodegradable starch-containing blown films that includes a step of extrusion of a mixture of raw unprocessed starch, copolymers including polyvinyl alcohol, a nucleating agent and a plasticizer. The process is said to avoid the need for pre-processing of the starch. U.S. Pat. No. 5,409,973 reports biodegradable compositions made by extrusion from destructurized starch and an ethylenevinyl acetate copolymer.

U.S. Pat. No. 5,087,650 relates to injection-molding of mixtures of graft polymers and starch to produce partially biodegradable products with acceptable elasticity and water stability.

U.S. Pat. No. 5,258,430 relates to the production of biodegradable articles from destructurized starch and chemically-modified polymers, including chemically-modified polyvinyl alcohol. The articles are said to have improved biodegradability, but to retain the mechanical properties of articles made from the polymer alone.

U.S. Pat. No. 5,292,782 relates to extruded or molded biodegradable articles prepared from mixtures of starch, a thermoplastic polymer and certain plasticizers.

U.S. Pat. No. 5,095,054 concerns methods of manufacturing shaped articles from a mixture of destructurized starch and a polymer.

U.S. Pat. No. 4,125,495 relates to a process for manufacture of meat trays from biodegradable starch compositions. Starch granules are chemically modified, for example with a silicone reagent, blended with polymer or copolymer and shaped to form a biodegradable shallow tray.

U.S. Pat. No. 4,673,438 relates to extrusion and injection molding of starch for the manufacture of capsules.

U.S. Pat. No. 5,427,614 also relates to a method of injection molding in which a non-modified starch is combined with a lubricant, texturing agent and a melt-flow accelerator.

U.S. Pat. No. 5,314,754 reports the production of shaped articles from high amylose starch.

EP published application no. 712883 (published May 22, 1996) relates to biodegradable, structured shaped products with good flexibility made by extruding starch having defined large particle size (e.g., 400 to 1500 microns). The application only exemplifies the use of high amylose starch and chemically-modified high amylose starch.

U.S. Pat. No. 5,512,090 refers to an extrusion process for the manufacture of resilient, low density biodegradable packaging materials, including loose-fill materials, by extrusion of starch mixtures comprising polyvinyl alcohol (PVA) and other ingredients. The patent refers to a minimum amount of about 5% by weight of PVA.

U.S. Pat. No. 5,186,990 reports a lightweight biodegradable packaging material produced by extrusion of corn grit mixed with a binding agent (guar gum) and water. Corn grit is said to contain among other components starch (76–80%), water (12.5–14%), protein (6.5–8%) and fat (0.5–1%). The patent teaches the use of generally known food extruders of a screw-type that force product through an orifice or extension opening. As the mixture exits the extruder via the flow plate or die, the super heated moisture in the mixture vaporizes forcing the material to expand to its final shape and density.

U.S. Pat. No. 5,208,267 reports biodegradable, compressible and resilient starch-based packaging fillers with high volumes and low weights. The products are formed by extrusion of a blend of non-modified starch with polyalkylene glycol or certain derivatives thereof and a bubble-nucleating agent, such as silicon dioxide.

U.S. Pat. No. 5,252,271 reports a biodegradable closed cell light weight packaging material formed by extrusion of a modified starch. Non-modified starch is reacted in an extruder with certain mild acids in the presence of water and a carbonate compound to generate $CO_2$. Resiliency of the product is said to be 60% to 85%, with density less than 0.032 $g/cm^3$.

U.S. Pat. No. 3,137,592 relates to gelatinized starch products useful for coating applications produced by intense mechanical working of starch/plasticizer mixtures in an extruder. Related coating mixtures are reported in U.S. Pat. No. 5,032,337 which are manufactured by the extrusion of a mixture of starch and polyvinyl alcohol. Application of thermomechanical treatment in an extruder is said to modify the solubility properties of the resultant mixture which can then be used as a binding agent for coating paper.

U.S. Pat. No. 5,660,900 discloses several extruder apparatuses for processing inorganically filled, starch-bound compositions. The extruders prepare a moldable mixture which is then formed into a desired configuration by heated molds.

U. S. Pat. Number 3,734,672 discloses an extrusion die for extruding a cup shaped shell made from a dough. In particular, the die comprises an outer base having an extrusion orifice or slot which has a substantial horizontal section and two upwardly extending sections which are slanted from the vertical. Further, a plurality of passage ways extend from the rear of the die to the slot in the face of the die. The passage way channels dough from the extruder through the extrusion orifice or slot.

Previously, in order to form clam shells, trays and other food product containers, biodegradable material was extruded as a flat sheet through a horizontal slit or linear extrusion orifice. The flat sheet of biodegradable material was then pressed between molds to form the clam shell, tray or other food package. However, these die configurations produced flat sheets of biodegradable material which were not uniformly thick, flexible, pliable and non-brittle. The packaging products molded from the flat sheets also had these negative characteristics.

SUMMARY OF THE INVENTION

According to one aspect of the present invention, there is provided an extrusion die having a flow control device which controls flow of biodegradable material through the extrusion die. The flow rate of the biodegradable material is regulated at a location upstream from the orifice and at the orifice itself to provide complete control of extrusion parameters. In particular, the head pressure of the biodegradable material behind the extrusion orifice is controlled to produce an extrudate having desired characteristics.

According to a further aspect of the invention, there is provided an extrusion die for extruding biodegradable material into a flexible, pliable and non-brittle structure, the extrusion die comprising: a cylindrical mandrel; a cylindrical outer ring positioned concentrically around the mandrel; an annular extrusion orifice between the mandrel and the outer ring; and a flow control device which controls flow of biodegradable material through the extrusion die.

According to another aspect of the invention, there is provided an extrusion die for extruding biodegradable material into a flexible, pliable and non-brittle structure, the extrusion die comprising: a cylindrical mandrel; a cylindrical outer ring positioned concentrically around the mandrel; an annular extrusion orifice between the mandrel and the outer ring; and a flow control device which controls flow of biodegradable material through the extrusion die, wherein the flow control device comprises a mechanism which translates the outer ring to adjust the width of the annular extrusion orifice, and wherein the flow control device further comprises a flow control channel upstream of the extrusion orifice which throttles flow of the biodegradable material through the die.

With respect to a further aspect of the invention, there is provided a process for extruding biodegradable material into a flexible, pliable and non-brittle structure, the process comprising: pressurizing biodegradable material in an extruder; cooking biodegradable material in the extruder; charging an extrusion die with biodegradable material from the extruder; controlling the flow rate of biodegradable material through the extrusion die.

According to a still further aspect of the invention, there is provided a process for extruding biodegradable material into a flexible, pliable and non-brittle structure, the process comprising: pressurizing biodegradable material in an extruder; cooking biodegradable material in the extruder; charging an extrusion die with biodegradable material from the extruder; controlling the flow rate of biodegradable material through the extrusion die, wherein the controlling comprises adjusting a width of an extrusion orifice, and wherein the controlling comprises throttling the biodegradable material upstream of the extrusion orifice through a flow control channel.

BRIEF DESCRIPTION OF THE DRAWINGS

The present invention is better understood by reading the following description of non-limitative embodiments, with reference to the attached drawings wherein like parts in each of the several figures are identified by the same reference character, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1:
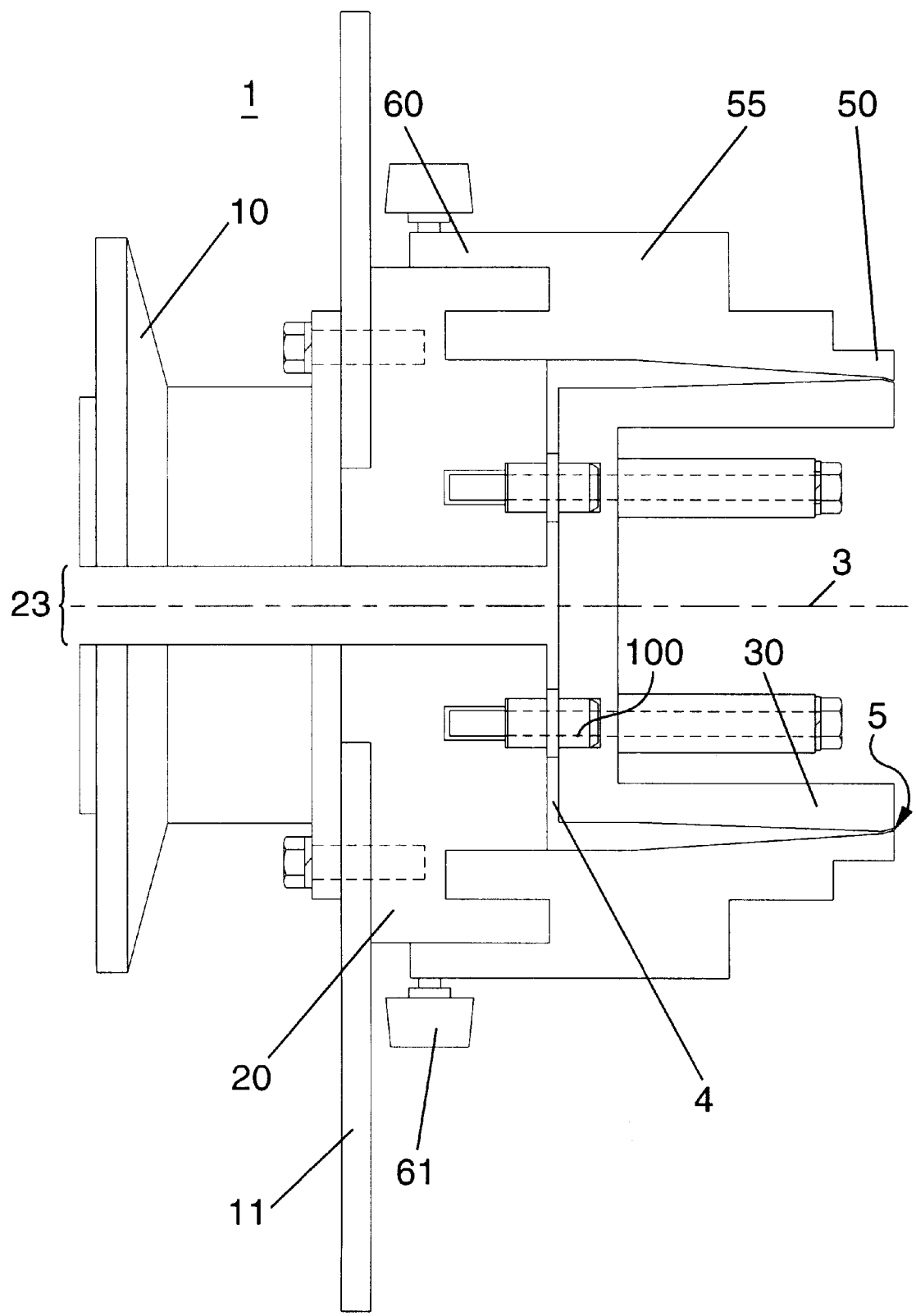
FIG. 1 is a cross-sectional view of an embodiment of the die fully assembled.

Referring to FIG. 1, a cross-sectional view of an embodiment of the invention is shown. The die 1 is made up of several discrete annular members which share the same longitudinal central axis 3. A mounting plate 20 is located in the center of the die 1 and is the member to which most of the remaining parts are attached. At one end of the mounting plate 20, an extruder adapter 10 is attached for connecting the die 1 to an extruder (not shown). Opposite to the extruder adapter 10, several spacers 100 are positioned in counter sunk holes in the mounting plate 20 at various locations equidistant from the longitudinal central axis 3. A mandrel 30 has counter sunk holes which correspond to those in the mounting plate 20. The mandrel 30 is fixed to the mounting plate 20 with the spacers 100 between. The spacers 100 create a gap between the mandrel 30 and the mounting plate 20, the thickness of which is dependent upon the thickness of the spacers 100. This gap is the flow control channel 4. An outer die structure 55 is attached to the mounting plate 20. The outer die structure 55 has a gap adjusting ring 60 at one end which is positioned concentrically around the cylindrical exterior of the mounting plate 20 and an outer ring 50 at the other end. The outer ring 50 of the outer die structure 55 and the mandrel 30 combine to form an extrusion orifice 5. The gap adjusting ring 60 secures the outer die structure 55 to the mounting plate 20 with lock screws 61 which engage the outer surface of the mounting plate 20.

Flow of the biodegradable material through the die 1 is controlled in two ways: (1) adjusting the width of the flow control channel 4, and (2) controlling the size of the extrusion orifice 5. Regarding the flow control channel 4, as noted above, biodegradable material is passed from the extruder through a flow bore 23 in the mounting plate 20 until it reaches the mandrel 30. From the central location, the biodegradable material is pushed radially outward between the mandrel 30 and the mounting plate 20 through the flow control channel 4. Of course, as the biodegradable material flows between the surfaces through the flow control channel 4, it passes around each of the spacers 100 which separate the mandrel 30 and the mounting plate 20. The width of the flow control channel 4 is adjusted by using spacers which have larger or smaller thicknesses in the longitudinal direction. In particular, if it is desirable to decrease flow of the biodegradable material through the flow control channel 4, relatively thin spacers 100 in the longitudinal direction are inserted between the mounting plate 20 and the mandrel 30. Alternatively, if it is desirable to increase a flow rate of biodegradable material through the flow control channel 4, relatively thick spacers 100 in the longitudinal direction are inserted between the mounting plate 20 and the mandrel 30. Therefore, in a preferred embodiment, the die 1 has several sets of spacers 100 which may be placed between the mounting plate 20 and the mandrel 30 to control the width of the flow control channel 4.

Additionally, flow of the biodegradable material through the extrusion orifice 5 is controlled by altering the width of the orifice. The thickness of the extrusion orifice 5 between the mandrel 30 and the outer ring 50 is adjusted by sliding the outer die structure 55 along the longitudinal central axis 3 out away from the stationary mandrel 30. Since the interior diameter of the outer die structure 55 is tapered from the outer ring 50 toward the gap adjusting ring 40, the outer die structure 55 has its smallest interior diameter at the outer ring 50. To produce a biodegradable extrudate with a very thin wall thickness, the gap adjusting ring 60 is pushed all the way onto the mounting plate 20. To produce a thicker biodegradable extrudate, the gap adjusting ring 60 is moved slightly away from the mounting plate 20 along the longitudinal central axis 3 in the direction of direction arrow 6, so that the outer ring 50 is positioned beyond the mandrel 30. Thus, a wider section of the outer die structure 55 is adjacent an orifice forming portion of the mandrel 30 so that the extrusion orifice 5 is thicker. Once the desired orifice size is obtained, lock screws 61 are screwed into the gap adjusting ring 60 to re-engage the mounting plate 20. This locks the outer die structure 55 in place to ensure the thickness of the extrusion orifice 5 remains constant during operation. Of course, a thicker orifice 5 allows the biodegradable material to flow more freely through the die 1.

Figure 2:
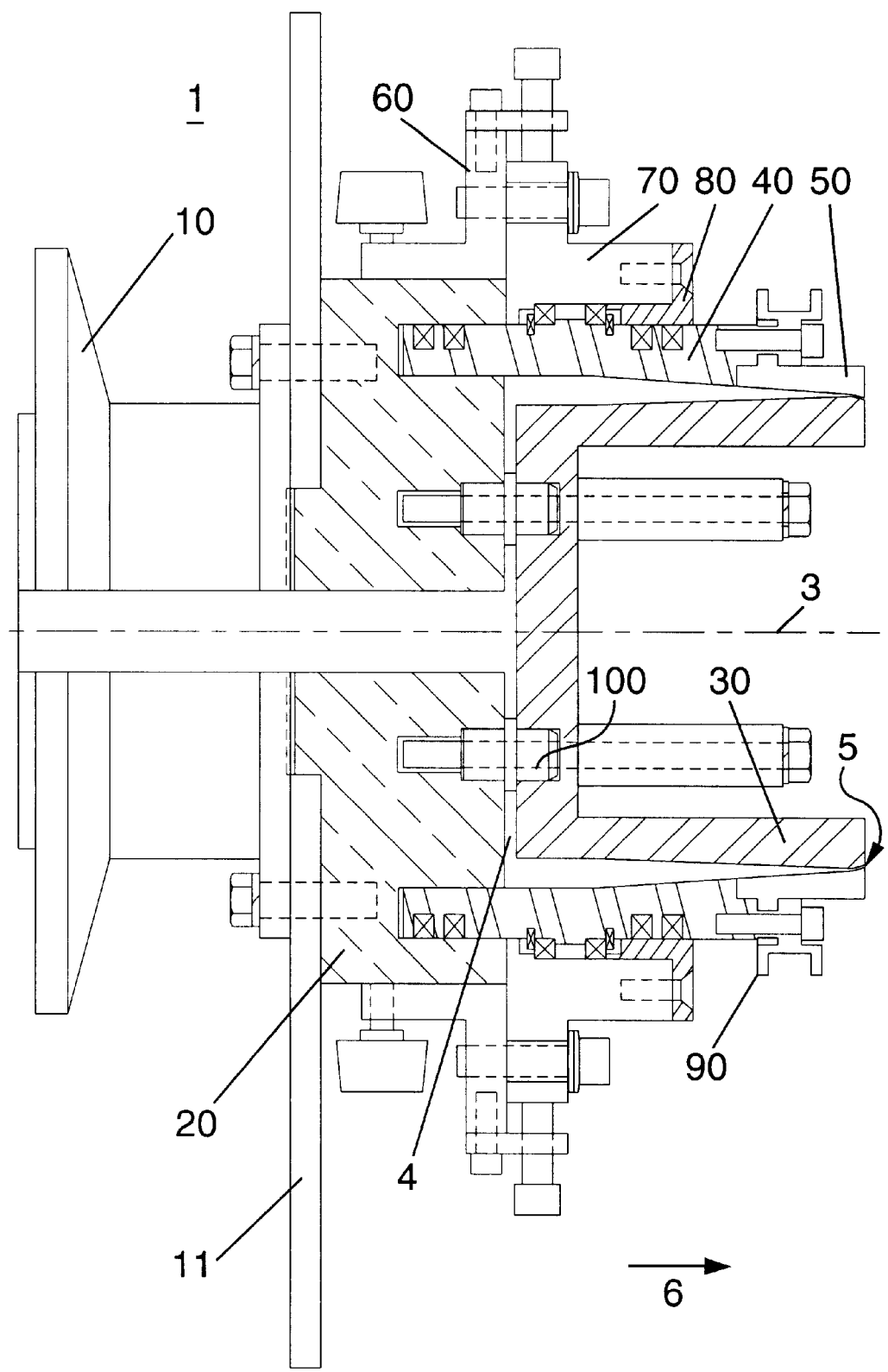
FIG. 2 is a cross-sectional view of a rotating die embodiment of the invention fully assembled.
Figure 3:
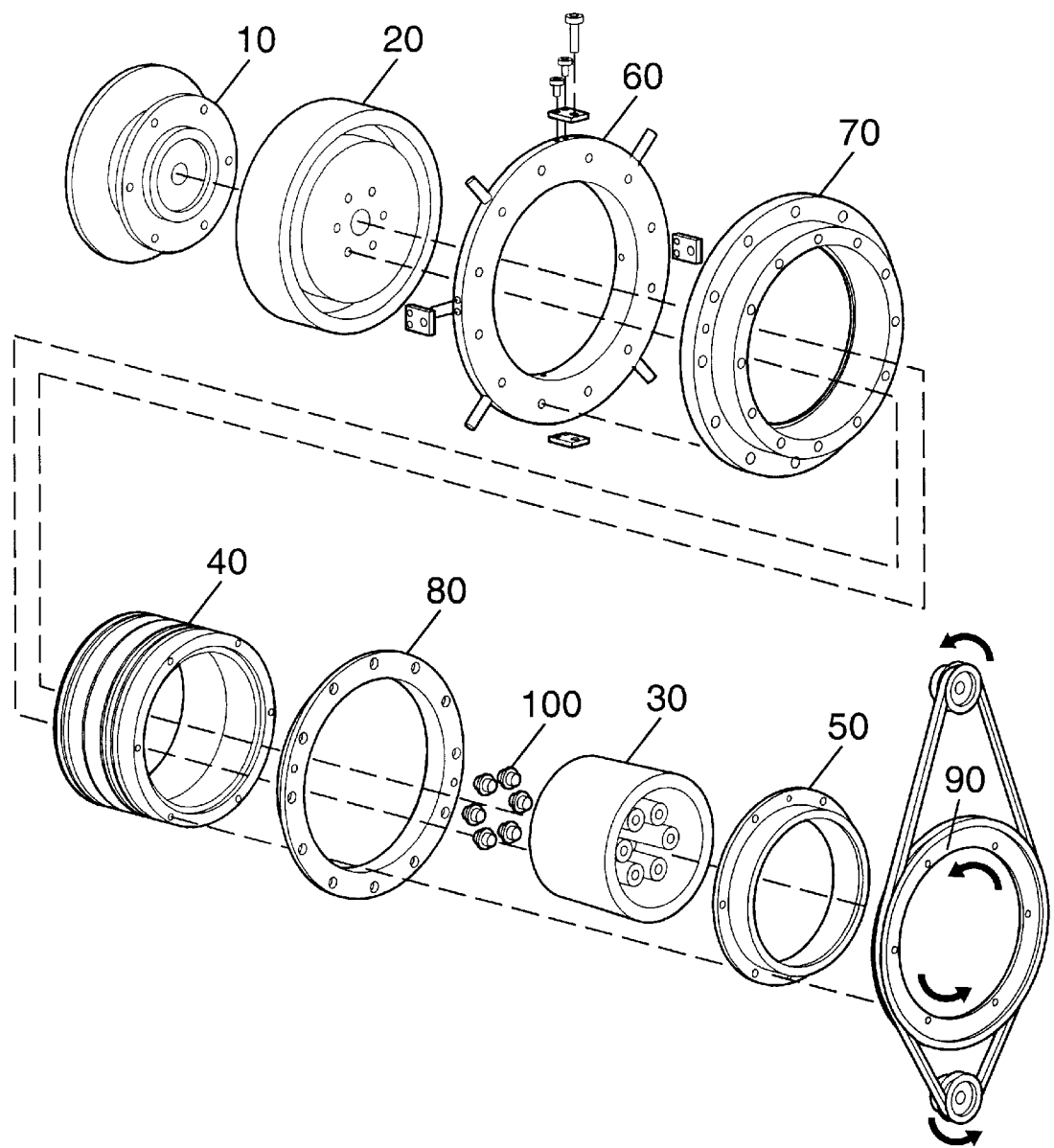
FIG. 3 is an exploded perspective view of the several parts which comprise the die shown in FIG. 2.

Referring to FIGS. 2 and 3, cross-sectional and exploded views, respectively, of an embodiment of the invention are shown. The die 1 is made up of several discrete annular members which share the same longitudinal central axis 3. A mounting plate 20 is located in the center of the die 1 and is the member to which most of the remaining parts are attached. At one end of the mounting plate 20, an extruder adapter is attached for connecting the die 1 to an extruder (not shown). A gap adjusting ring 60 is placed concentrically around the cylindrical exterior of the mounting plate 20. A bearing housing 70 lies adjacent the gap adjusting ring 60 and the mounting plate 20. A seal ring 40 is placed within the bearing housing 70 and is inserted into an annular spin channel of the mounting plate 20. At an end opposite to the extruder adapter 10, several spacers 100 are positioned in counter sunk holes in the mounting plate 20 at various locations equidistant from the longitudinal central axis 3. A mandrel 30 has counter sunk holes which correspond to those in the mounting plate 20. The mandrel is fixed to the mounting plate 20 with the spacers 100 between. An outer ring 50 is attached to the seal ring 40 around the outside of the mandrel 30 to form an extrusion orifice 5 between the outer ring 50 and the mandrel 30. Finally, a die wheel 90 is attached to the outer ring 50 for rotating the outer ring 50 about the mandrel 30.

Figure 4:
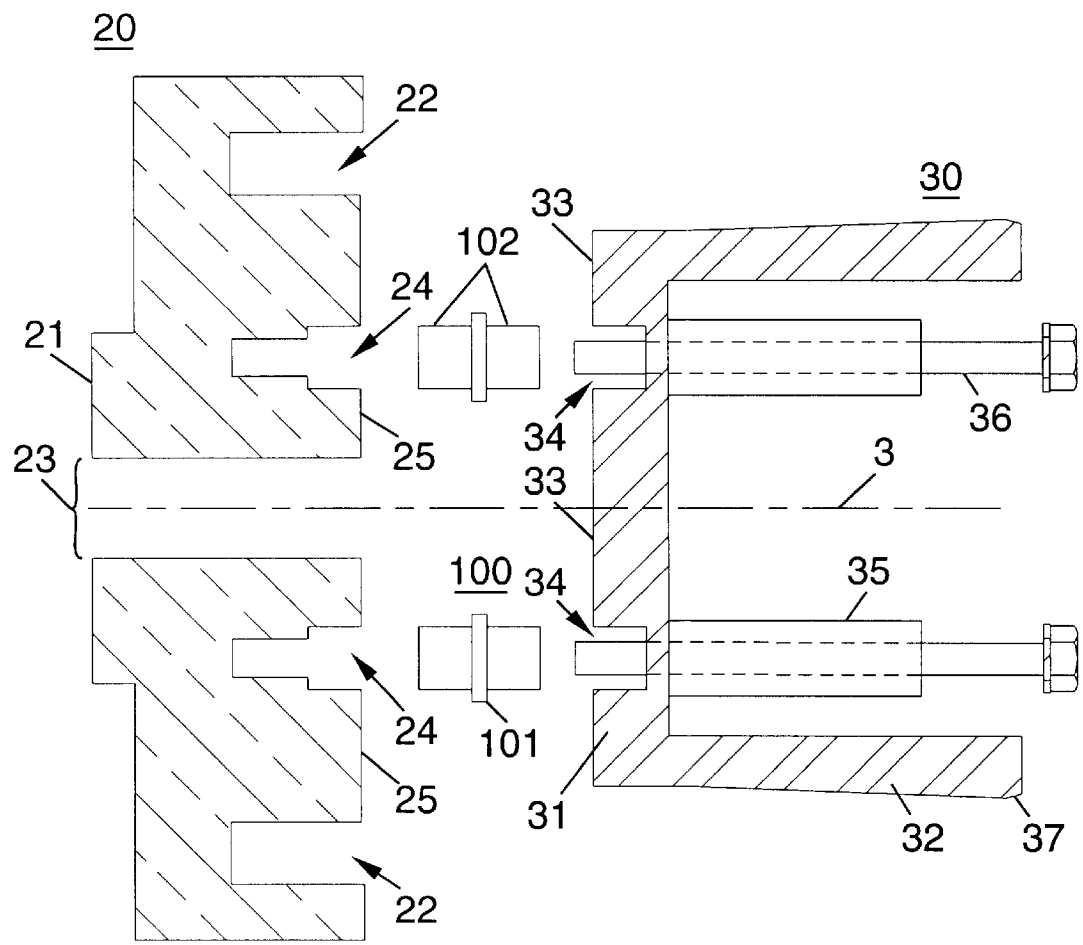
FIG. 4 is a cross-sectional exploded view of a mandrel, mounting plate and spacers.

Referring to FIG. 4, a cross section of the mounting plate 20, spacers 100 and the mandrel 30 are shown disassembled. The mounting plate 20 is basically a solid cylinder with a cylindrical flow bore 23 cut in the middle along the longitudinal central axis 3. One end of the mounting plate 20 comprises a mounting shoulder 21 for engagement with the extruder adapter 10 (shown in FIGS. 2 and 3). Opposite the mounting shoulder 21, the mounting plate 20 has a annular spin channel 22 for receiving the seal ring 40 (shown in FIGS. 2 and 3). Between the cylindrical flow bore 23 at the center and the spin channel 22, the mounting plate 20 has a disc-shaped flow surface 25. The mounting plate 20 also has several mounting plate counter sunk holes 24 for receiving spacers 100 such that the counter sunk holes 24 are drilled in the flow surface 25. In the figure, only two counter sunk holes 24 are shown because the view is a cross section along a plane which intersects the longitudinal central axis 3. All of the mounting plate counter sunk holes 24 are equidistant from each other and from the longitudinal central axis 3.

The mandrel 30 is a bowl shaped structure having a base 31 and sides 32. As shown in FIG. 4, the mandrel 30 is oriented sideways so that the central axis of the mandrel is collinear with the longitudinal central axis 3 of the die. Unlike the mandrel 20, which has a flow bore 23 through the center, the mandrel 30 has a solid base 31. The outside surface of the base 31 is a base flow surface 33. The mandrel 30 has several countersunk holes 34 which are cut in the base flow surface 33. In the figure, only two mandrel countersunk holes 34 are shown because the view is a cross-section along a plane which intersects the longitudinal central axis 3. All of the mandrel countersunk holes 34 are equidistant from each other and from the central axis 3. The inside of the mandrel 30 is hollowed out to reduce its overall weight.

Spacers 100 are used to mount the mandrel 30 to the mounting plate 20. Each of the spacers 100 comprise male ends 102 for insertion into mounting plate and mandrel countersunk holes 24 and 34. Of course, the outside diameter of the male ends 102 is slightly smaller than the inside diameters of mounting plate and mandrel countersunk holes 24 and 34. Between the male ends 102, each of the spacers 100 comprise a rib 101 which has an outside diameter larger than the inside diameters of the mounting plate and mandrel countersunk holes 24 and 34. The rib 101 of each spacer 100 has a uniform thickness in the longitudinal direction to serve as the spacer mechanism between the assembled mounting plate and mandrel.

The mandrel 30 is attached to the mounting plate 20 with mandrel bolts 36. The mandrel bolts 36 extend through the base 31 of the mandrel 30, through the spacers 100 and into treaded portions in the bottom of the mounting plate counter sunk holes 24. While the heads of the mandrel bolts 36 could be made to rest firmly against the inside of the base 31 of the mandrel, in the embodiment shown, the mandrel bolts extend through risers 35 so that the heads of the mandrel bolts 36 are more accessible from the open end of the mandrel 30. In this embodiment, one end of each of the risers 35 rests securely against the inside of the mandrel base 31 while the other end of each riser is engaged by the head of a mandrel bolt 36.

Figure 5:
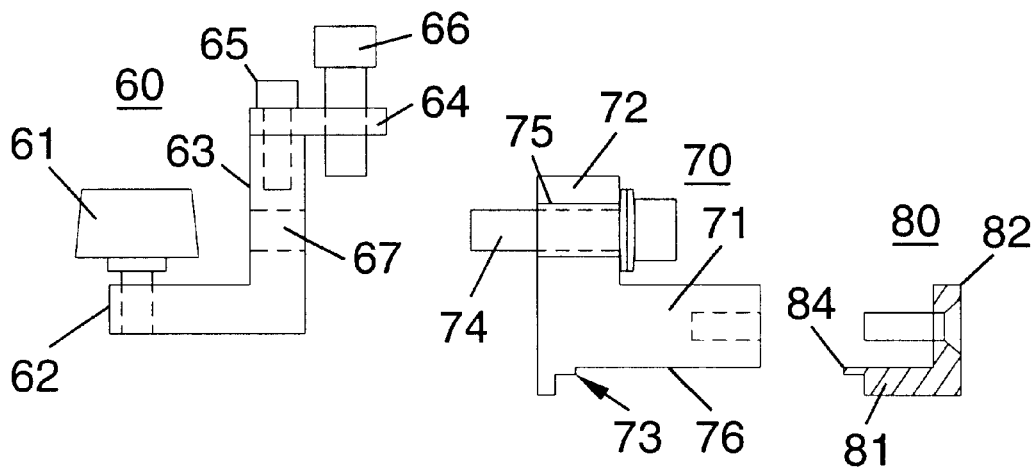
FIG. 5 is a cross-sectional exploded view of a gap adjusting ring, a bearing housing and an end cap.
Figure 5:
Figure 5:
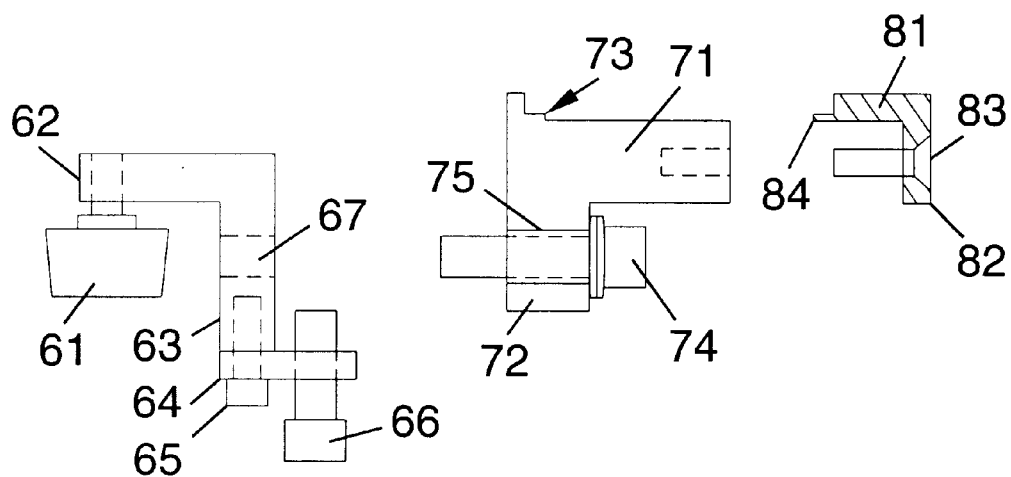

Referring to FIG. 5, a cross-sectional view of the gap adjusting ring 60, the bearing housing 70, and the end cap 80 are shown disassembled. The gap adjusting ring 60 is a ring shaped member having a longitudinal central axis 3 and an inner diameter slightly greater than the outside diameter of the mounting plate 20 (shown in FIGS. 2 and 3). The gap adjusting ring 60 also has several lock screws 61 which extend through an inner portion 62 of the gap adjusting ring 60 for engagement with the mounting plate 20 once the gap adjusting ring 60 is placed around the outside of the mounting plate 20. Also, the gap adjusting ring 60 has an outer portion 63 for engagement with the bearing housing 70. At the outer edge of the outer portion 63, the gap adjusting ring 60 has centering lugs 64 which are attached via lug bolts 65. In the embodiment shown, four centering lugs 64 are attached to the outer portion 63 of the gap adjusting ring 60. The centering lugs 64 are spaced around the gap adjusting ring 60 so that one is at the top, bottom, and sides, respectively. The centering lugs 64 extend from the outer portion 63 in a longitudinal direction for positioning engagement with the bearing housing 70. The centering bolts 66 poke through the centering lugs 64 in the part of the centering lugs 64 which extend from the outer portion 63 in the longitudinal direction. The centering bolts 66 poke through in a direction from outside the die toward the longitudinal central axis 3. Finally, the gap adjusting ring 60 has threaded holes 67 a various locations around the outer portion 63 for receiving screws 74.

The bearing housing 70 is an annular ring which has a longitudinal central axis 3. The bearing housing 70 has a bearing portion 71 and a support portion 72. The support portion 72 is annular with is greatest cross-section in a direction transverse to the longitudinal central axis 3. The bearing housing 70 is attachable to the gap adjusting ring 60 by the support portion 72 which engages the outer portion 63 of the gap adjusting ring 60. In the embodiment shown, this engagement between the bearing housing 70 and the gap adjusting ring 60 is accomplished by screws 74 between these two members. The support portion 72 has several slip holes 75 which protrude through the support portion 72 in a longitudinal direction. In one embodiment, twelve slip holes 75 are positioned equidistant from each other around the support portion 72 and are positioned equidistant from the longitudinal central axis 3. The inside diameter of each slip hole 75 is larger than the outside diameter of screws 74 so that there is substantial "play" between the screws 74 and the slip holes 75. While the slip holes 75 are larger than the screws 74, the slip holes 75 are small enough so that the heads of the screws 74 securely engage the support portion 72 of the bearing housing 70.

The other major part of the bearing housing 70 is the bearing portion 71 which is an annular section having its greatest thickness in the longitudinal direction. The interior surface of the bearing portion 71 is a bearing surface 76 for engaging lateral support bearings 42 (shown in FIG. 6). The bearing surface 76 supports the lateral support bearings 42 in a plane normal to the longitudinal central axis 3. Protruding from the bearing surface 76 near the support portion 72, the bearing housing 70 has a bearing housing lateral support flange 73 which supports a lateral support bearing 42 of the seal ring 40 (shown in FIG. 6).

When the bearing housing 70 is attached to the gap adjusting ring 60, the relative positions of the two devices may be adjusted. In particular, during assembly, the centering bolts 66 of the gap adjusting ring 60 are relaxed to provide enough space for the support portion 72 of the bearing housing 70. The bearing housing 70 is then placed directly adjacent the gap adjusting ring 60 with the support portion 72 within the extended portions of centering lugs 64. The screws 74 are then inserted through the slip holes 75 and loosely screwed into threaded holes 67 in the gap adjusting ring 60. The centering bolts 66 are then adjusted to collapse on the support portion 72 of the bearing housing 70. The centering bolts 66 may be adjusted different amounts to push the bearing housing 70 off center relative to the gap adjusting ring 60. Because the slip holes 75 are larger than the screws 74, the centering bolts 66 freely push the bearing housing 70 in one direction or the other. By varying the pressure of the centering bolts 66 against the outer surface of the bearing housing 70, the bearing housing 70, seal ring 40 and outer ring 50 may be perturbed from its original position to a more desirable position. Once the desired relative position of the bearing housing 70 to the gap adjusting ring 60 is obtained, the screws 74 are tightened to firmly attach the two members.

The end cap 80 is an annular ring which has a longitudinal central axis 3. The interior portion of the end cap 80 is a stabilizer 81 and the exterior is a fastener flange 82. Fastener holes 83 are drilled in the fastener flange 82 for inserting fasteners which secure the end cap 80 to the bearing portion 71 of the bearing housing 70. The outside diameter of the stabilizer 81 of the end cap 80 is slightly smaller than the inside diameter of the bearing portion 71 of the bearing housing 70. This allows the stabilizer 81 to be inserted into the bearing portion 71. At the distal end of the stabilizer 81, there is an end cap lateral support flange 84 which supports a lateral support bearing 42 (shown in FIG. 6). Therefore, when the end cap 80 is securely fastened to the bearing housing 70, the bearing housing lateral support flange 73 and the end cap lateral support flange 84 brace the lateral support bearings 42 (shown in FIG. 6) against movement in the longitudinal directions.

Figure 6:
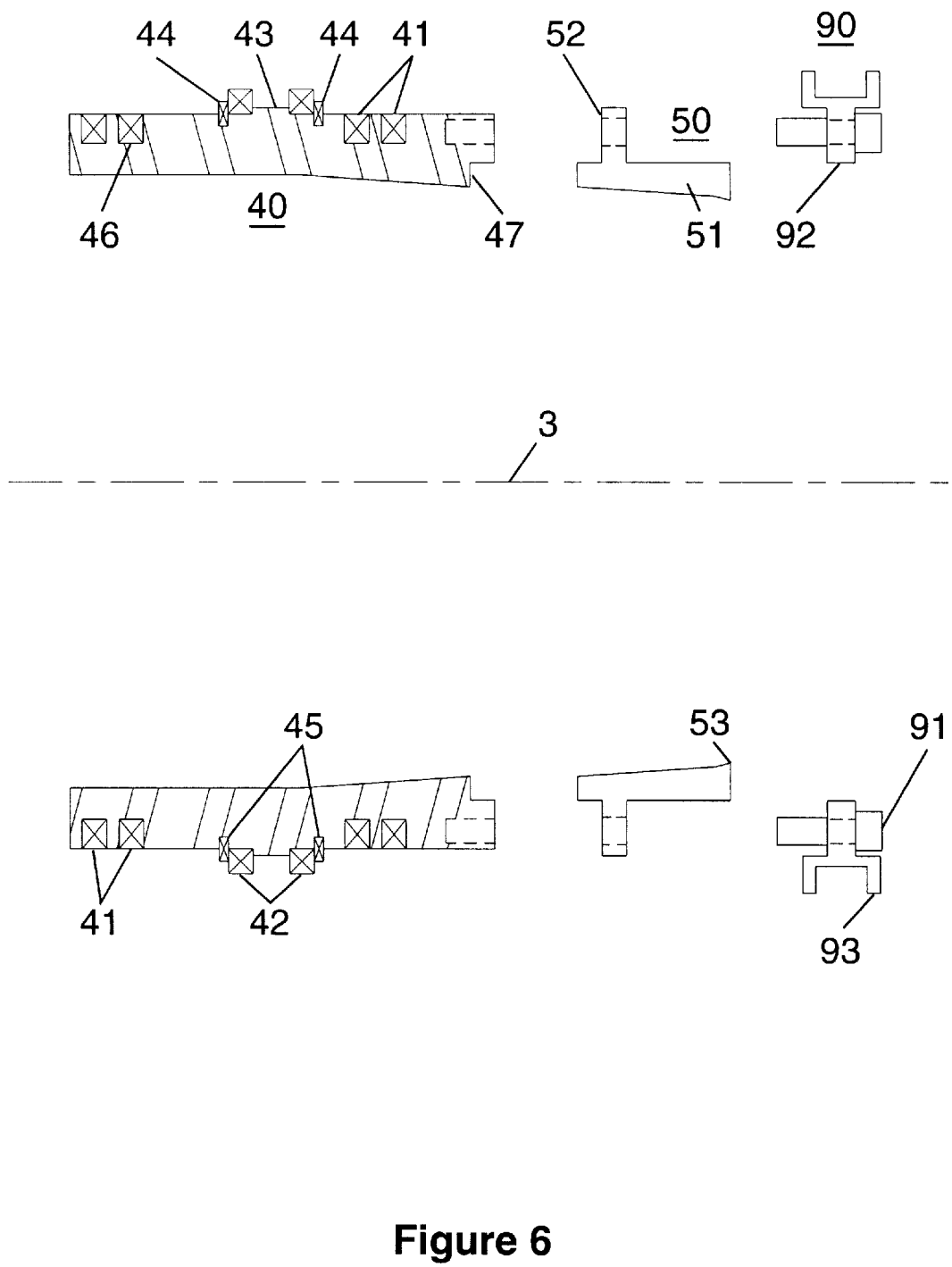
FIG. 6 is an exploded cross-sectional view of a seal ring, an outer ring and a die wheel.

Referring to FIG. 6, a cross-sectional view of the seal ring 40, the outer ring 50 and the die wheel 90 are shown disassembled. The seal ring 40 is a cylindrical member having a longitudinal central axis 3. The seal ring 40 has an interior diameter which decreases from one end to the other. At the end of the seal ring 40 which has the smallest inside diameter, the seal ring 40 has a notch 47 for engaging the outer ring 50 as discussed below. On the outside of the seal ring 40, there are four superior piston rings 41 for engaging the mounting plate 20 and the end cap 80 (both shown in FIGS. 2 and 3). The seal ring 40 also comprises two lateral support bearings 42. The lateral support bearings 42 are separated by a bearing spacer flange 43 which is positioned between the two lateral support bearings 42. The seal ring 40 further comprises two retaining rings 44 which are positioned on the outsides of the lateral support bearings 42. Thus, the seal ring 40 is assembled by slipping one of the lateral support bearings 42 over each end of the seal ring 40 until they are each adjacent opposite sides of the bearing spacer flange 43. Next, retaining rings 44 are slipped over each end of the seal ring 40 until they snap into grooves 45 at the outsides of the lateral support bearings 42. Thus, the lateral support bearings 42 are secured between the bearing spacer flange 43 and the retaining rings 44. Finally, the superior piston rings 41 are placed in piston slots 46.

The outer ring 50 is a cylindrical member having a longitudinal central axis 3. The outer ring 50 has a ring portion 51 and a fastener flange 52. Longitudinal holes are cut through the fastener flange 52 for inserting fasteners which secure the outer ring 50 to an end of the seal ring 40. The outside diameter of the ring portion 51 is slightly smaller than the inside diameter of the notch 47 of the seal ring 40. This allows the outer ring 50 to be assembled to the seal ring 40 by inserting the ring portion 51 into the notch 47. The inside diameter of the ring portion 51 tapers from the end which attaches to the seal ring 40 to the other. At the end of the ring portion 51 having the smallest inside diameter, the outer ring 50 comprises a lip 53 which defines one side of the extrusion orifice 5 (shown in FIG. 2).

The die wheel 90 is a cylindrical member with a wheel flange 92 and a drive section 93. Holes are drilled through the wheel flange 92 for inserting wheel fasteners 91 which secure the die wheel 90 and the outer ring 50 to the seal ring 40. The drive section 93 is a device which engages a drive mechanism for rotating the die wheel 90. In the embodiment shown in the figure, the drive section is a pulley for engaging a drive belt.

Assembly of the complete die 1 is described with reference to FIGS. 1 and 2. First, the extruder adapter 10 is secured to the mounting plate 20 with a back plate 11 between. Next, with further reference to FIG. 4, several spacers 100 are place in the mandrel 30 by inserting a male end 102 of each spacer 100 into a mandrel counter sunk hole 34, until all the mandrel counter sunk holes 34 have a spacer 100. The mandrel 30 is then placed adjacent the mounting plate 20 with the protruding male ends 102 of the spacers 100 being inserted into the mounting plate counter sunk holes 24. The mandrel 30 is then attached to the mounting plate 20 with spacers 100 between by the mandrel bolts 36. In particular, the risers 35 are slipped over the shanks of the mandrel bolts 36 and the mandrel bolts 36 are inserted through the mandrel base 31, the mandrel counter sunk holes 34, the spacers 100, and the mounting plate counter sunk holes 24. The bottoms of the mounting plate counter sunk holes 24 are threaded so that the mandrel bolts 36 may be screwed into the mounting plate 20. The mandrel bolts 36 are the screwed into the threaded bottoms of each mounting plate countersunk hole 24 to fasten the mandrel 30 to the mounting plate 20. With further reference to FIG. 5, the gap adjusting ring 60 is slipped over the exterior of the mounting plate 20. The lock screws 61 are then tightened against the exterior of the mounting plate 20. The bearing housing 70 is then positioned with the support portion 72 against the outer portion 63 of the gap adjusting ring 60. The centering bolts 66 are adjusted to center the bearing housing 70 about the longitudinal central axis 3 and the screws inserted through slip holes 75 and tightened into the threaded holes 67 of the gap adjusting ring 60. Next, with further reference to FIG. 6, the seal ring 40 having superior piston rings 41, lateral support bearings 42 and retaining rings 44 attached thereto, is rotatably attached to the bearing housing 70. In particular, the seal ring 40 is inserted into the bearing housing 70 and then into the spin channel 22 of the mounting plate 20. The seal ring 40 is pushed all the way into the spin channel 22 of the mounting plate 20 until the first of the lateral support bearings 42 rests firmly against the bearing housing lateral support flange 73. In this position, two of the four superior piston rings 41 form a seal between the seal ring 40 and the spin channel 22 of the mounting plate 20. The seal ring 40 is held in this position by inserting the stabilizer 81 of the end cap 80 into the bearing portion 71 of the bearing housing 70. The end cap 80 is pushed all the way into the bearing housing 70 until the end cap lateral support flange 84 contacts the second of the lateral support bearings 42 of the seal ring 40. Once in place, the end cap 80 is fixed to the bearing housing 70 by inserting fasteners through the fasteners holes 83 of the fastener flange 82 and into the bearing portion 71 of the bearing housing 70. The an interior surface of the stabilizer 81 of the end cap 80 engages the remaining two superior pistons rings 41 of the seal ring 40 so that the seal ring 40 is completely stabilized and allowed to spin freely about the longitudinal central axis 3. With the end cap 80 securely fastened to the bearing housing 70, the seal ring 40 is securely fastened in the lateral direction between the lateral support flanges 73 and 84. With the seal ring 40 securely in place, the outer ring 50 and die wheel 90 are then attached to the end which protrudes from the mounting plate 20. In particular, the ring portion 51 of the outer ring 50 is inserted into the notch 47 of the seal ring 40 and the wheel flange 91 of the die wheel 90 is positioned adjacent the fastener flange 52 of the outer ring 50. Wheel fasteners 91 are then inserted through the wheel flange 92 and the fastener flange 52 and locked into the seal ring 40.

Once assembled, both the extruder adapter 10 and the mounting plate 20 further comprise a flow bore 23 which extends from the extruder (not shown) to the flow surface 25, as shown in FIGS. 2 and 4. Thus, the die 1 operates such that extrudate biodegradable material is pushed by the extruder through the flow bore 23 until it reaches the base flow surface 33 of the mandrel 30. The biodegradable extrudate then flows radially outward around the spacers 100 between the flow surface 25 of the mounting plate 20 and the base flow surface 33 of the mandrel 30. This disc-like space between the mounting plate 20 and the mandrel 30 is the flow control channel 4. From the flow control channel 4, the biodegradable extrudate then enters a cylindrical space between the seal ring 40 and the mandrel 20 and is pushed through this space toward the extrusion orifice 5 between the mandrel 30 and the outer ring 50. As the biodegradable extrudate moves toward the extrusion orifice 5, the die wheel 90 is rotated to rotate the outer ring 50 and seal ring 40 around the stationary mandrel 30. Thus, the biodegradable extrudate is twisted by the rotating outer ring 50. As the extrudate exits the extrusion orifice 5, a tubular product of twisted biodegradable material is produced. As described fully below, because the seal ring 40 is rotatably mounted within the bearing housing 70, the seal ring 40 may be made to rotate about the mandrel 30 as the extrudate is pushed through the orifice 5. Flow of the biodegradable material through the die 1 is controlled in two ways: (1) adjusting the width of the flow control channel 4, and (2) controlling the size of the extrusion orifice 5. Regarding the flow control channel 4, as noted above, biodegradable material is passed from the extruder through a flow bore 23 in the mounting plate 20 until it reaches the base flow surface 33 of the mandrel 30. From the central location, the biodegradable material is pushed radially outward between the base flow surface 33 of the mandrel 30 and the flow surface 25 of the mounting plate 20. Of course, as the biodegradable material flows between the surfaces through the flow control channel 4, it passes around each of the spacers 100 which separate the mandrel 30 and the mounting plate 20. The width of the flow control channel 4 is adjusted by using spacers which have larger or smaller ribs 101 (See FIG. 4). In particular, if it is desirable to decrease flow of the biodegradable material through the flow control channel 4, spacers 100 having ribs 101 which are relatively thin in the longitudinal direction are inserted between the mounting plate 20 and the mandrel 30. Alternatively, if it is desirable to increase a flow rate of biodegradable material through the flow control channel 4, spacers 100 having ribs 101 with relatively larger thicknesses in the longitudinal direction are inserted between the mounting plate 20 and the mandrel 30. Therefore, in a preferred embodiment, the die 1 has several sets of spacers 100 which may be placed between the mounting plate 20 and the mandrel 30 to control the width of the flow control channel 4.

Additionally, flow of the biodegradable material through the extrusion orifice 5 is controlled by altering the width of the extrusion orifice 5. The thickness of the extrusion orifice 5 between the mandrel lip 37 and the outer ring lip 53 is adjusted by sliding the gap adjusting ring 60, the bearing housing 70, the seal ring 40, and the outer ring 50 along the longitudinal central axis 3 out away from the stationary mandrel 30. Since the interior diameter of the ring portion 51 of the outer ring 50 is tapered from the end which attaches to the seal ring 40, the outer ring 50 has its smallest interior diameter at the outer ring lip 53. To produce a biodegradable extrudate with a very thin wall thickness, the gap adjusting ring 60 is pushed all the way onto the mounting plate 20 until the outer ring lip 53 is directly opposite the mandrel lip 37. To produce a thicker biodegradable extrudate, the gap adjusting ring 60 is moved slightly away from the mounting plate 20 along the longitudinal central axis 3 in the direction of direction arrow 6 (shown in FIG. 2), so that the outer ring lip 53 is positioned beyond the mandrel lip 37. Thus, a wider section of the ring portion 51 is adjacent the lip 37 of the mandrel 30 so that the extrusion orifice 5 is thicker. Once the desired orifice size is obtained, lock screws 61 are screwed into the gap adjusting ring 60 to re-engage the mounting plate 20. This locks the gap adjusting ring 60, the bearing housing 70, the seal ring 40, and the outer ring 50 in place to ensure the thickness of the extrusion orifice 5 remains constant during operation. A thicker extrusion orifice 5 increases flow through the die.

Figure 7A:
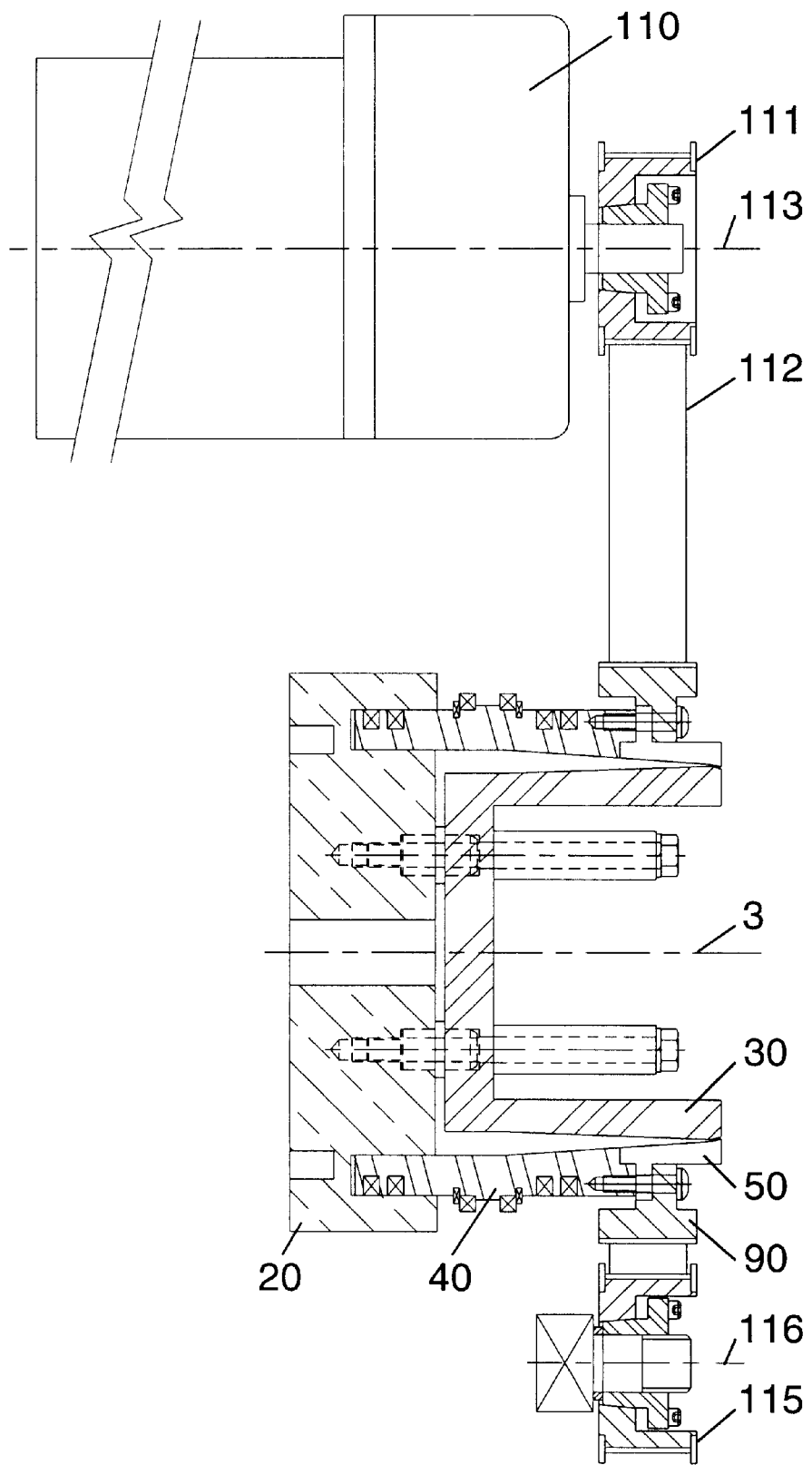
FIG. 7A is a cross-sectional side view of an embodiment of the invention having a motor and belt for rotating an outer ring about a mandrel.
Figure 7B:
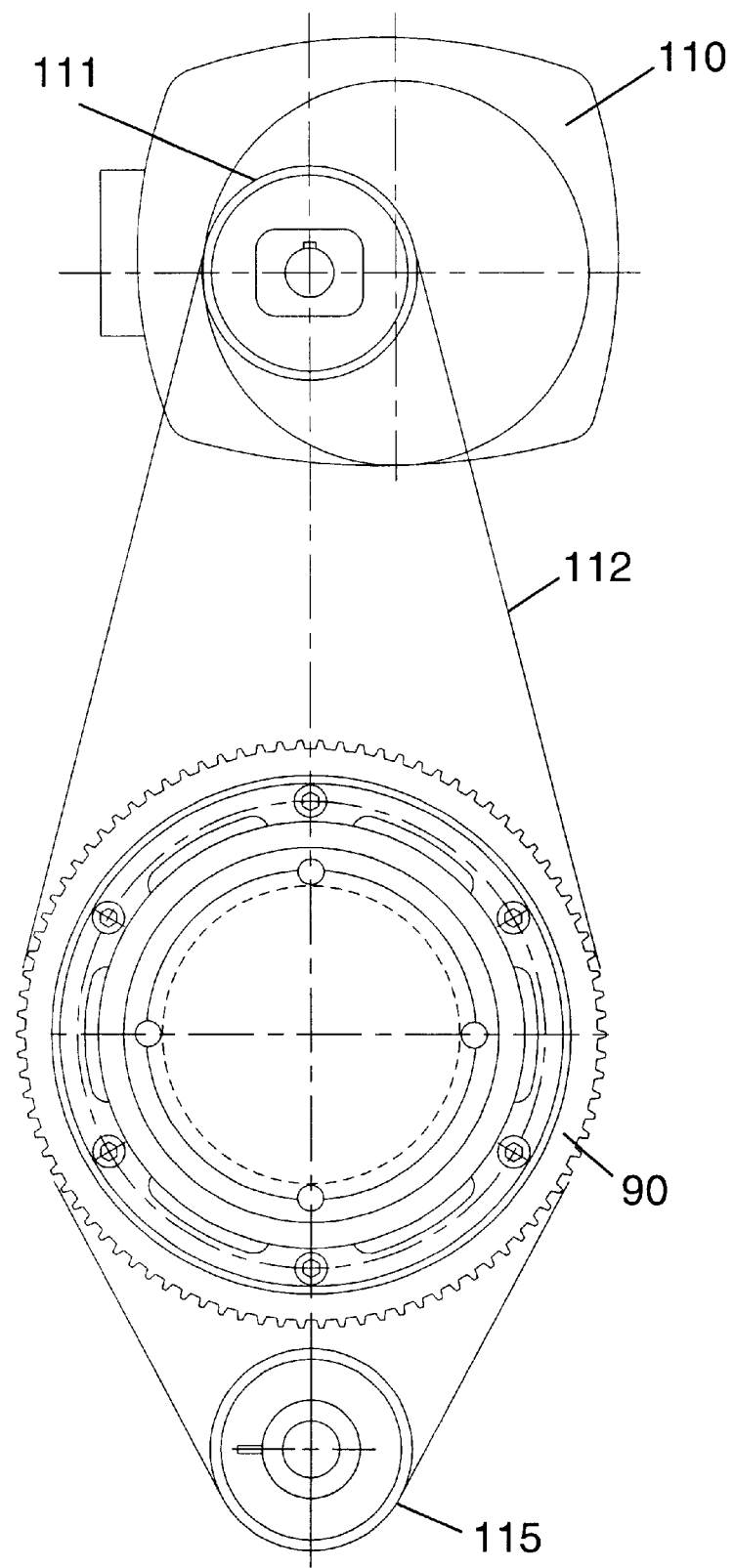
FIG. 7B is an end view of the embodiment of the invention as shown in FIG. 7A.

Referring to FIGS. 7A and 7B, side and end views of portions of an embodiment of the invention for rotating the outer ring of the die are shown, respectively. The mandrel 30 is attached to the mounting plate 20 so that the mandrel 30 is locked in place. The seal ring 40 and outer ring 50 are rotatably mounted around the mandrel 30. A die wheel 90 is also attached to the outer ring 50. All of these members have longitudinal central axes which are collinear with longitudinal central axis 3. The device also has a motor 110 which has a drive axis 113 which is parallel to longitudinal central axis 3. Attached to a drive shaft of motor 110, there is a drive wheel 111. The motor 110 and drive wheel 111 are positioned so that drive wheel 111 lies in the same plane as the die wheel 90, the plane being perpendicular to the longitudinal central axis 3. Opposite the drive wheel 111, the system further has a snubber wheel 115 which is also positioned in the perpendicular plane of the drive wheel 111 and the die wheel 90. The snubber wheel 115 has a snubber axis 116 which is also parallel to the longitudinal central axis 3. Thus, the drive wheel 111 and the snubber wheel 115 are positioned at opposite ends of the system with the die wheel 90 between. A drive belt 112 engages the drive wheel 111, the die wheel 90 and the snubber wheel 115. The snubber wheel 115 has no drive mechanism for turning the drive belt 112. Rather, the snubber wheel 115 is an idle wheel which only turns with the drive belt 112 when the drive belt 112 is driven by the motor 110. The snubber wheel 115 serves only to evenly distribute forces exerted by the drive belt 112 on the die wheel 90. Because the drive wheel 111 and snubber wheel 115 are positioned on opposite sides of the die wheel 90, forces exerted by the drive belt 112 on the die wheel 90 are approximately equal in all transverse directions. If the snubber wheel 115 were not placed in this position and the drive belt 112 engaged only the drive wheel 111 and the die wheel 90, a net force would be exerted by the drive belt 112 on the die wheel 90 in the direction of the motor 110. This force would pull the die wheel 90 and thus the outer ring 50 out of center from its position about the stationary mandrel 30. Of course, this would have the detrimental effect of producing an extrudate tube of biodegradable material which would have a wall thickness greater on one side than on the other. Therefore, the snubber wheel 115 is positioned in the system to prevent the die wheel 90 from being pulled from its central location around the mandrel 30.

In a preferred embodiment, the drive belt 112 is a rubber belt known to those of skill in the art. Alternatively, chains or mating gears may be used to mechanically connect the motor 110 to the die wheel 90. A typical one-third horse power electric motor is sufficient to produce the necessary torque to drive the drive belt 112. Further, the gear ratios between the drive wheel 111 and the die wheel 90 are such that the die wheel 90 rotates at approximately 15 rotations per minute. Depending on the particular gear system employed, more powerful motors may be necessary.

While the particular embodiments for extrusion dies as herein shown and disclosed in detail are fully capable of obtaining the objects and advantages herein before stated, it is to be understood that they are merely illustrative of the preferred embodiments of the invention and that no limitations are intended by the details of construction or design herein shown other than as described in the appended claims.

LIST OF CHARACTER DESIGNATIONS

1. Die
3. Longitudinal Central Axis
4. Flow Control Channel
5. Extrusion Orifice
6. Direction Arrow
10. Extruder Adapter
11. Back Plate
20. Mounting Plate
21. Mounting Shoulder
22. Spin Channel
23. Flow Bore
24. Countersunk Holes
25. Flow Surface
30. Mandrel
31. Mandrel Base
32. Mandrel Sides
33. Base Flow Surface
34. Countersunk Holes
35. Risers
36. Mandrel Bolts
37. Mandrel Lip
40. Seal Ring
41. Superior Piston Rings
42. Lateral Support Bearings
43. Bearing Spacer Flange
44. Retaining Rings 45. Grooves
46. Piston Slots
47. Notch
50. Outer Ring
51. Ring Portion
52. Fastener Flange
53. Outer Ring Lip
55. Outer Die Structure
60. Gap Adjusting Ring
61. Lock Screws
62. Inner Portion
63. Outer Portion
64. Centering Lugs
65. Lug Bolts
66. Centering Bolts
67. Threaded Holes
70. Bearing Housing
71. Bearing Portion
72. Support Portion
73. Lateral Support Flange
74. Screws
75. Slip Holes
76. Bearing Surface
80. End Cap
81. Stabilizer
82. Fastener Flange
83. Fastener Holes
84. Lateral Support Flange
90. Die Wheel
91. Wheel Fastener
92. Wheel Flange
93. Drive Section
100. Spacer
101. Rib
102. Male Ends
110. Motor
111. DriveWheel
112. Drive Belt
113. Drive Axis
115. Snubber Wheel
116. Snubber Axis

What is claimed is:

1. An extrusion die for extruding biodegradable material into a shaped article, said extrusion die comprising:
   a mandrel;
   an outer member positioned around said mandrel;
   an extrusion orifice between said mandrel and said outer member;
   a flow control device comprising a flow control channel which throttles flow of biodegradable material through the extrusion die; and further comprising a mounting plate and at least one spacer, wherein said mandrel is attached to said mounting plate with said at least one spacer between, wherein said mounting plate and said mandrel define said flow control channel.

2. An extrusion die as in claim 1, wherein said flow control device comprises a gap adjustment ring which adjusts the width of said extrusion orifice.

3. An extrusion die as in claim 2, wherein said outer member is connected to said gap adjustment ring, wherein said gap adjustment ring adjusts the width of said extrusion orifice by translating the outer member.

4. An extrusion die as in claim 1, wherein said flow control device comprises a flow control channel which throttles flow of the biodegradable material through the die.

5. An extrusion die as claimed in claim 1, wherein a thickness of said at least one spacer determines the width of said flow control channel.

6. An extrusion die as claimed in claim 1, wherein said at least one spacer comprises a plurality of spacers between said mounting plate and said mandrel.

7. An extrusion die as claimed in claim 1, wherein said flow control channel is a disc shaped cavity between said mandrel and said mounting plate, and wherein the biodegradable material flows through the flow control channel from a central location in the flow control channel outwardly toward a peripheral location in the flow control channel.

8. An extrusion die for extruding biodegradable material, said extrusion die comprising:
   a cylindrical mandrel;
   a cylindrical outer ring positioned around said mandrel;
   an annular extrusion orifice between said mandrel and said outer ring;
   a flow control device which controls flow of biodegradable material through the extrusion die, wherein said flow control device comprises a flow control channel upstream of the annular extrusion orifice, wherein the flow control channel throttles flow of the biodegradable material through the die, and further comprising a mounting plate and at least one spacer, wherein said mandrel is attached to said mounting plate with said at least one spacer between, wherein said mounting plate and said mandrel define said flow control channel.

9. An extrusion die as claimed in claim 8, wherein a thickness of said at least one spacer determines the width of said flow control channel.

10. An extrusion die as claimed in claim 8, wherein said at least one spacer comprises a plurality of spacers between said mounting plate and said mandrel.

11. An extrusion die as claimed in claim 8, wherein said flow control channel is a disc shaped cavity between said mandrel and said mounting plate, and wherein the biodegradable material flows through the flow control channel from a central location in the flow control channel outwardly to a peripheral location in the flow control channel.

12. A process for preparing biodegradable material for manufacturing shaped articles, said process comprising:
   introducing biodegradable material into an extruder;
   subjecting the biodegradable material in the extruder to pressure and heat;
   extruding the biodegradable material from the extruder through an extrusion die; and
   controlling the flow rate of biodegradable material through the extrusion die during said extruding, wherein said controlling comprises adjusting the head pressure of the biodegradable material in the extrusion die and adjusting at least one cross-sectional area of a biodegradable material flow path within the extrusion die.

13. A process as in claim 12, wherein said controlling comprises adjusting the cross-sectional area of an extrusion orifice.

14. A process as in claim 13, wherein said adjusting comprises translating at least one wall of opposing walls of the extrusion orifice.

15. A process as in claim 12, wherein said controlling comprises adjusting the cross-sectional area of a biodegradable material flow path at a location upstream of an extrusion orifice.

16. A process as in claim 15, wherein said controlling comprises throttling the biodegradable material through a flow control channel.

17. A process for preparing biodegradable material for manufacturing shaped articles, said process comprising:

introducing biodegradable material into an extruder;

subjecting the biodegradable material in the extruder to pressure and heat;

extruding the biodegradable material from the extruder through an extrusion die;

controlling the flow rate of biodegradable material through the extrusion die during said extruding, wherein said controlling comprises adjusting the cross-sectional area of an extrusion orifice and wherein said controlling further comprises adjusting the cross-sectional area of a biodegradable material flow path at a location upstream of the extrusion orifice.

18. A process as in claims 17, wherein said adjusting comprises translating at least one wall of opposing walls of the extrusion orifice.

19. A process as in claim 17, wherein said adjusting the cross-sectional area of a biodegradable material flow path at a location upstream of the extrusion orifice comprises throttling the biodegradable material through a flow control channel.

* * * * *